Figure 1:
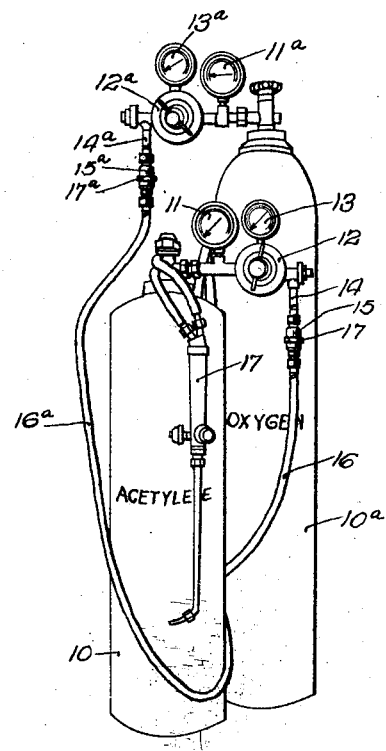

Jan. 8, 1929.

P. DORSEY 1,698,156

DOUBLE ACTING CHECK VALVE FOR COMPRESSED GASES

Filed Oct. 16, 1922

INVENTOR:
Parmer Dorsey
By John Howard McElroy
HIS ATTY.

Patented Jan. 8, 1929.

1,698,156

UNITED STATES PATENT OFFICE.

PARMER DORSEY, OF WICHITA, KANSAS, ASSIGNOR TO THE IMPERIAL BRASS MANUFACTURING COMPANY, OF CHICAGO, ILLINOIS, A CORPORATION OF ILLINOIS.

DOUBLE-ACTING CHECK VALVE FOR COMPRESSED GASES.

Application filed October 16, 1922. Serial No. 594,776.

My invention is concerned with a novel double-acting check-valve for compressed gases, etc., per se, and in combination with a source of gas under pressure, such as an acetylene generator for cylinders containing compressed acetylene and oxygen for use with cutting or welding torches, together with said torches or some other consumer of gas, where it performs a double function, as follows:

It is known to those skilled in the art that explosions are sometimes caused in acetylene generators or tanks due to so-called "flash backs" from the flame of the cutting or welding torch to the gas supply, and my invention is designed to prevent the possibility of such flash backs, and also to prevent the escape of gas into the room in case the hose connecting the check valve and the torch be ruptured by the flash back or otherwise.

To this end, it consists of a novel check-valve located in the tubing between the generator or gas cylinder and the torch, and so designed and constructed that, while not interfering with the normal flow of the gas, it will close toward the generator or cylinder in case of a flash back, and also so that it will close toward the torch in case of a rupture in the tubing between the valve and the torch.

To illustrate my invention, I annex hereto a sheet of drawings, in which the same reference characters are used to designate identical parts in all the figures, of which,—

Figure 2:
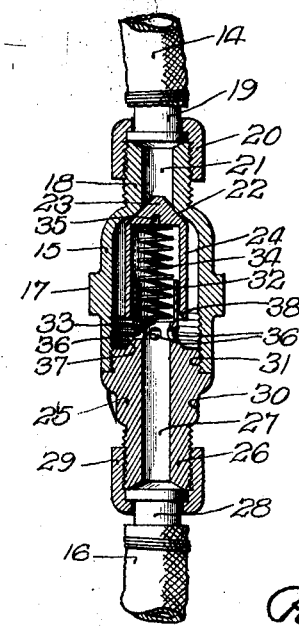

Fig. 1 is a perspective view showing my invention as applied to a cutting or welding torch supplied with acetylene and oxygen at the proper pressure from tanks containing said gases under pressure; and Fig. 2 is a longitudinal central section through said check valve.

In the drawings, I have, for convenience, shown the acetylene as supplied from the tank 10 containing it under pressure, although of course it will be understood that it might be supplied from an acetylene generator of any desired construction. The tank 10 is provided with the customary pressure gauge 11, and the customary gas reducer 12 having the pressure gauge 13 to show the pressure of the reduced gas, and the reducer 12 is connected by the short tube 14 with the check valve 15 to be described, the other end of which is connected by the flexible tube 16 with the cutting or welding torch 17. The oxygen cylinder 10ª is provided with a similar gauge 11ª, reducing valve 12ª, pressure gauge 13ª, tube 14ª, check valve 15ª, and flexible tube 16ª, likewise connected to the torch 17.

The check valves 15 and 15ª may be identical, and the preferred construction thereof is shown in Fig. 2, where the main cylindrical body portion 15 has on its exterior the annular portion 17, hexagonal in its external cross section so that a wrench can be applied thereto if necessary. Its contracted, externally-threaded end 18 is connected to the tube fitting 19 by the union nut 20 in any customary manner. The reduced end 18 has the outlet 21 therethrough, and between the main body and the outlet is the conically-tapered valve-seat 22 with which co-operates the tapered end 23 of the hollow cylindrical valve member 24. The other end of the valve body is preferably formed by the cylindrical part 25 having the externally threaded reduced end 26 with the outlet 27 extending thereto and connected to the tube fitting 28 of the tube 16 by the union nut 29. This portion 25 has the external face 30 hexagonal in cross section so that a wrench can be applied thereto, if necessary, to screw its threaded portion 31 into the internally-threaded end of the main portion 15. The member 25 has a tubular extension 32 surrounding the outlet 27 and provided on its interior with the annular offset 33, which forms a seat for one end of the helically-coiled expanding spring 34, the other end of which engages the closed end of the valve 24, said closed end being preferably provided on its interior with the diametrically extending groove 35 adapted to receive the end of a screwdriver, so that by turning it, the valve on its seat may be readily ground. The extension 32 is provided below the end of the valve 24 in its normal position with the radially extending ports or outlets 36, and just below these outlets the extension 32 has formed on its exterior the tapered valve-seat 37, which is adapted to co-operate with the correspondingly tapered annular valve surface 38 formed on the inner surface of the end of the valve 24.

The operation of the complete apparatus will now be readily understood. When no gas is flowing through the valve, the spring 34 holds the end 23 of the valve 24 against the seat 22, but the pressure of the spring 34 is so weak that it is readily overcome by any ordinary working pressure caused by opening the torch. Now such working pressure, while unseating the valve, will not move it down below the ports 36, so that the gas in the desired quantity can pass through the valve. In case of a flash back, the back pressure delivered upward through the outlet 27 and against the hollow interior of the valve 24 will overcome the working pressure of the gas and immediately seat the valve, so as to prevent the flame extending beyond the safety valve. In case of a rupture of the hose 16 below the valve, there is such a large outlet for the gas under pressure that the unusual flow of the gas will force the valve 24 down until its surface 38 is seated on the surface 37, thereby closing the ports 36 and preventing any escape of the gas into the room. It will of course be understood that the surfaces 37 and 38 can be readily ground simply by turning the sleeve 24 while holding said surfaces in contact.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a safety valve, the combination with a cylindrical valve casing having axial outlets at the ends thereof with a valve seat directly in one outlet, and a second valve seat around the other outlet on an inwardly projecting tubular extension of said outlet, of a hollow valve plunger having one conical end co-operating with the second-mentioned valve-seat, and a helically-coiled expanding spring within the hollow plunger and tending to hold it against said first-mentioned valve-seat, said tubular extension having radial ports therein between the two valve seats.

2. In a safety valve, the combination with the tubular valve-body portion having the reduced end provided with an outlet and a valve seat at the beginning of said outlet, of a tubular portion closing the large end of said body portion and having an outlet therethrough with an internally-projecting tubular extension surrounding said outlet, said tubular extension having an internal annular flange, radial apertures and an annular valve seat beneath said apertures, the hollow cylindrical valve member having its closed end co-operating with the upper seat and its open end co-operating with the lower seat, and a helically-coiled expanding spring within said valve having one end co-operating therewith and the other end with the internal flange in the tubular extension.

In witness whereof, I have hereunto set my hand this 9th day of October, 1922.

PARMER DORSEY.